July 5, 1932.  H. V. GREEN  1,866,349
ADJUSTABLE SPEED INDUCTION MOTOR
Filed Jan. 22, 1929
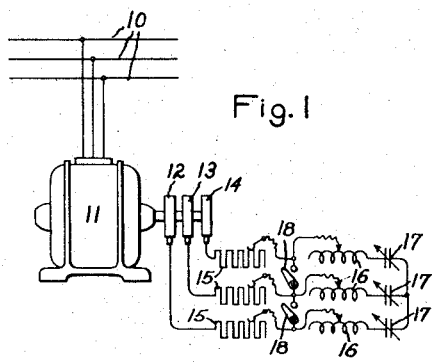
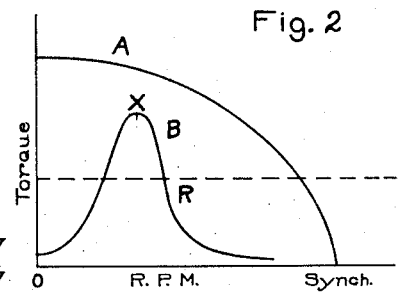
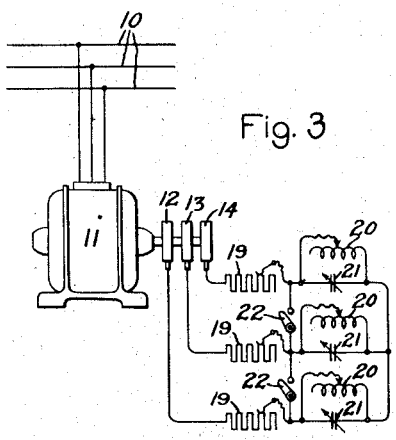
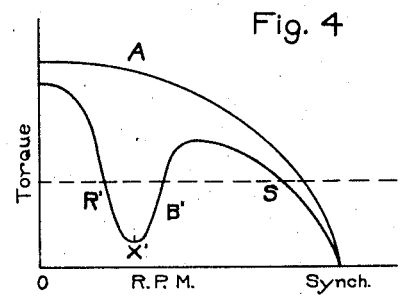
Inventor:
Harold V. Green,
by Charles E. Mullan
His Attorney Patented July 5, 1932

1,866,349

UNITED STATES PATENT OFFICE

HAROLD V. GREEN, OF WILMETTE, ILLINOIS, ASSIGNOR TO GENERAL ELECTRIC COMPANY, A CORPORATION OF NEW YORK

ADJUSTABLE SPEED INDUCTION MOTOR

Application filed January 22, 1929. Serial No. 334,274.

My invention relates to a method and apparatus for controlling the speed of alternating current induction machines. More particularly my invention relates to a method and apparatus for controlling the speed of induction motors of the wound secondary slip ring type.

In many instances it is desirable to vary the speed of induction motors without interfering with the primary circuit, and it is the primary object of my invention to provide speed adjusting means associated with the secondary circuit whereby relatively low stable operating speeds may be obtained at good power factor and high efficiency.

In carrying my invention into effect in one form I provide an adjustable speed induction motor, the primary of the motor being connected to an alternating current supply system and the secondary of the motor being connected in a circuit which may be adjustably tuned to resonance at different secondary frequencies for regulating the current allowed to flow in the secondary winding.

The features of my invention which are believed to be novel and patentable will be pointed out in the claims appended hereto. For a better understanding of my invention reference is made to the accompanying drawing in which Fig. 1 shows adjustable tuning means connected in series in the secondary circuit of an induction motor; Fig. 2 represents the speed torque curves of the motor with the apparatus arranged as illustrated in Fig 1; these two figures are illustrated to assist in the description and understanding of my invention which as represented in Fig. 3 shows the inductance and capacity connected in parallel with the secondary of a polyphase induction motor; and Fig. 4 represents the speed torque curves of the motor with the apparatus so connected.

Referring to Fig. 1 I have represented an alternating current polyphase supply system 10. The motor 11 is an ordinary induction motor with its primary winding located on the stator and connected to the supply system 10. The motor has the secondary winding located on the rotor and connected to the slip rings 12, 13 and 14. In series with the secondary winding is connected an adjustable resistance 15, adjustable inductive coils 16, and adjustable condensers 17. The switches 18 are connected in the secondary circuit so as to short circuit the inductive coils 16 and the condenser 17 during starting.

Consider now the conditions when current is supplied to the primary winding of the induction machine 11 by the alternating current supply system 10. It will be evident to those familiar with the subject that by providing the secondary with sufficient resistance an increased torque may be obtained at starting. The resistance may be internal with respect to the motor or external as I have illustrated in Fig. 1 by the numbers 15.

If current is supplied to the primary winding of the induction motor 11 and the switches 18 shown in Fig. 1 are closed the motor will operate with a torque characteristic similar to the one explained above and illustrated by the curve A in Fig. 2, but if the switches 18 are opened at starting so as to include the inductive coils 16 and condensers 17 in the secondary winding circuit the starting torque will depend upon the relative magnitudes of the inductance 16 and capacity 17 and if the inductance is allowed to predominate at the maximum secondary frequency the starting torque of the motor will be much less than the maximum torque as illustrated by the curve B. The inductive reactance of the coils 16 is directly proportional to the slip frequency, hence when the slip frequency is near or equal to the frequency of the supply system the torque of the motor is small, due to the limited amount of current allowed to flow in the secondary winding circuit because of the high inductive reactance. As the motor is allowed to rotate and the slip frequency is decreased the inductive reactance is decreased, but the capacity reactance is increased since the reactance of the condensers 17 is inversely proportional to the slip frequency. As the motor speed is increased the slip frequency of the motor is decreased and the current in the secondary circuit will increase until the total inductive reactance is equal to the capacity reactance, and then the circuit is said to be in resonance as indicated at $x$ on curve B. At this point when the inductance and capacity are in series the reactance of the circuit is a minimum, the power factor is a maximum, and a maximum amount of power current is allowed to flow through the circuit, thus giving a maximum torque which in some cases may even be greater than the maximum torque when only resistance is used in the secondary circuit. If the slip frequency is further decreased the capacity reactance is increased, and the torque will gradually decrease as represented by the curve B in Fig. 2.

Referring to Fig. 3 I have shown the inductive coils 20 and condensers 21 connected in parallel with each other and in series with the resistances 19 and the secondary winding of the induction motor 11 and 22 represents the short circuiting switches. When the slip frequency is near or equal to the frequency of the supply system 10 the capacity reactance of the condensers 21 being inversely proportional to the slip frequency will afford very little resistance to the current in the secondary circuit. The reactance of the inductive coils 20 being a maximum at this period, most, or practically all of the current will flow through the condensers 21 and the starting torque will be a maximum as represented by the curve B' in Fig. 4. As the slip frequency is decreased the current will decrease until the capacity reactance 21 is equal to the inductive reactance 20 and then this part of the circuit is in resonance and the torque will be decreased to the value illustrated by the point X' shown on curve B' in Fig. 4. If the frequency is further decreased the inductive reactance of the coils 20 will be decreased, thus allowing the current in the secondary circuit to increase and the torque will be increased to some extent as represented by the curve B' in Fig. 4, although the power factor is reduced. By continually increasing the speed of the motor the secondary current will after a certain speed is reached decrease due to the decrease in slip voltage and if the motor is caused to operate at its synchronous speed the torque will be zero, as shown by the curves in Fig. 4.

Referring to Figs. 2 and 4 it will be apparent that the most desirable stable operating speeds of the motor will be when it is operating along the portions of the curves B and B' designated by R and R' respectively. When the motor is caused to operate at such speeds a wide range of torque is obtained with a comparatively small change in speed. If the inductive and capacity reactances are connected in parallel as shown in Fig. 3 and the motor is caused to operate at a speed corresponding to the range S shown on the curve B', the motor will have an additional stable operating range having the same torque as when operating along a given portion of the curve designated by R', but it will be operating at a greater speed, thus we have two stable running speed ranges R' and S in Fig. 4 and only one stable operating range R in Fig. 2. An additional advantage in causing the motor to operate at a speed corresponding to the ranges R and R' shown in Figs. 2 and 4 respectively is that the capacity reactance will predominate, thus tending to counteract the inductive reactance of the secondary winding of induction motor 11 and to increase the power factor of the motor circuit.

To bring the motor up to speed it will generally be desirable to close the switches 22 shown in Fig. 3, to allow the motor to accelerate with the normal speed torque curve A shown in Fig. 4 and after the motor has reached a speed slightly above the desired running speed the switches are opened and the motor will run at a speed depending on the value of resonant frequency selected. It is obvious that with a given value of motor torque selective operation of the motor may be obtained at either of the two stable operating speeds respectively corresponding to the two stable operating speed ranges R' and S in Fig. 4. Assume that the switches 22 were closed to give motor operation at the lower of the two stable operating speeds, i. e. at the speed corresponding to the range R'. A change over to the motor operation at the higher of the two stable operating speeds, i. e., at the speed corresponding to the range S may be obtained by closing the switches 22, thus causing the motor to accelerate and when the motor has accelerated to this higher speed the switches 22 are opened and the motor will continue to operate at this higher speed. Over the stable operating speed range R' of the motor a large variation in the load produces only a small change in speed whereas over the stable operating range S a larger change in speed will result. It will be understood by reference to the curves that the conditions tend to create a stability in the torque characteristic, even though actual resonance does not exist. After the switches in the secondary circuit have been opened the speed of the motor can then be controlled by varying the reactance of the inductive coils, or of the condensers, or both. It is obvious that adjusting the relative values of the reactances of the inductive coils 20 and condensers 21 causes the curve B' in Fig. 4 to move to the right or left, thus giving for each different adjustment a different pair of stable operating speeds at which the motor may be operated with a given value of motor torque. The relatively low stable operating speeds are obtained without excessive losses.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. The combination with an induction motor having primary and secondary windings, of an external circuit connected to said secondary winding for regulating the power factor and speed of the motor during its operation, said external circuit containing relatively adjustable inductances and condensers connected in parallel with each other.

2. A speed regulating system for a wound secondary induction motor to give selective operation of said motor over either of two stable operating speed ranges separated by an unstable operating speed range, said system comprising a circuit containing relatively adjustable inductance and capacity connected in parallel with each other, connecting means between said secondary winding and said circuit, and switches included in an additional circuit connected across said connecting means, said switches being adapted in one position to open said additional circuit and in another position to close said additional circuit.

3. A speed regulating system for a wound secondary induction motor to give selective operation of said motor at either of two stable operating speeds with a given value of motor torque, said system comprising a circuit containing inductance and capacity connected in parallel with each other, connecting means between said secondary winding and said circuit, and switches included in an additional circuit connected across said connecting means, said switches being adapted in one position to open said additional circuit and in another position to close said additional circuit.

4. The method of selectively operating an induction motor at either of two stable operating speeds with a given value of motor torque, which consists in inserting parallel connected inductance and capacity into the circuit of the motor secondary winding after said motor has been started and when it has accelerated to the lower of said two speeds, said inductance and capacity having such relative values that the secondary winding circuit will be in resonance at a frequency corresponding to a speed which is intermediate said two speeds, excluding said inductance and capacity from said secondary winding circuit to obtain operation of the motor at the higher of said two speeds, and inserting said inductance and capacity into said secondary winding circuit when the motor has accelerated to the higher of said two speeds.

In witness whereof, I have hereunto set my hand this 19th day of January, 1929.

HAROLD V. GREEN.